US012012765B2

(12) United States Patent
Pulido, Jr.

(10) Patent No.: US 12,012,765 B2
(45) Date of Patent: Jun. 18, 2024

(54) ADJUSTABLE DOOR LIFTER

(71) Applicant: Gabriel Pulido, Jr., Pasadena, CA (US)

(72) Inventor: Gabriel Pulido, Jr., Pasadena, CA (US)

( * ) Notice: Subject to any disclaimer, the term of this patent is extended or adjusted under 35 U.S.C. 154(b) by 1014 days.

(21) Appl. No.: 16/961,226

(22) PCT Filed: Mar. 7, 2019

(86) PCT No.: PCT/US2019/021222
§ 371 (c)(1),
(2) Date: Jul. 9, 2020

(87) PCT Pub. No.: WO2019/173634
PCT Pub. Date: Sep. 12, 2019

(65) Prior Publication Data

US 2021/0062521 A1 Mar. 4, 2021

Related U.S. Application Data

(60) Provisional application No. 62/639,892, filed on Mar. 7, 2018.

(51) Int. Cl.
*E04F 21/00* (2006.01)
*B66F 11/00* (2006.01)
*B66F 15/00* (2006.01)

(52) U.S. Cl.
CPC .......... *E04F 21/0023* (2013.01); *B66F 11/00* (2013.01); *B66F 15/00* (2013.01)

(58) Field of Classification Search
CPC ........ E04F 21/0023; B66F 11/00; B66F 15/00
(Continued)

(56) References Cited

U.S. PATENT DOCUMENTS 3,305,219 A * 2/1967 Rhodes ..................... B66B 9/16 414/11
6,079,696 A 6/2000 Bette
(Continued)

FOREIGN PATENT DOCUMENTS

DE 9312875 U1 12/1993

OTHER PUBLICATIONS

Roughneck Door and Board Lifter Product Specification (2017) (Year: 2017).*
(Continued)

*Primary Examiner* — Lynn E Schwenning
(74) *Attorney, Agent, or Firm* — Trojan Law Offices

(57) ABSTRACT

A door lifting device comprises a base plate, a fulcrum extending perpendicularly from the base plate, and a balance beam having a first end and a second end pivotally connected on the fulcrum. The balance beam includes a foot plate attached to the first end of the balance beam, and a door carriage attached to the second end of the balance beam. The balance beam can be adjusted to a selected height relative to the base plate. When the selected height of the balance beam relative to the base is increased, the pivot point is increased relative to the base plate. The balance beam can further, based on the selected height, be pivoted from a first location to a second location such that the door. When the pivot point is shifted away from the door carriage to the second position from the first position on the balance beam, the height of the door carriage relative to the surface is adjusted from the first height to the second height.

11 Claims, 8 Drawing Sheets

(58) Field of Classification Search
USPC .................................................... 414/10–12
See application file for complete search history.

(56) References Cited

U.S. PATENT DOCUMENTS

| | | | | |
|---|---|---|---|---|
| 8,128,066 | B2 | 3/2012 | Durantt | |
| 9,624,082 | B1 | 4/2017 | Provines | |
| 2010/0202859 | A1 | 8/2010 | Smith | |
| 2012/0267588 | A1 | 10/2012 | Dunca | |
| 2015/0314886 | A1 * | 11/2015 | Guida ..................... | B64F 1/224<br>254/129 |

OTHER PUBLICATIONS

"Roughneck Door & Bar Lifter" (Toolstation) 2017 (2017); retrieved from the internet Apr. 29, 2019; <URL=https://www.toolstation.com/roughneck-door-bar-lifter/p11020>.
"Ezy Hang Door Lifter Review" (HCI) Jul. 22, 2009 (Jul. 22, 2009); retrieved from the internet Apr. 29, 2019; <URL=https://www.homeconstructionimprovement.com/ezy-hang-door-lifter-review/>.

* cited by examiner

ADJUSTABLE DOOR LIFTER

CROSS-REFERENCE TO RELATED APPLICATIONS

The application claims priority to and benefit of U.S. Provisional Patent Application No. 62/639,892, filed on Mar. 7, 2018, the content of which is incorporated by reference in its entirety.

FIELD OF THE INVENTION

The present invention relates to an adjustable door lifts, and more particularly, to an adjustable door lifter where the height of the door lifter can be increased or decreased depending on the installation needs of the door. Furthermore, the invention includes a mean to balance to the door to ensure that it stays upright and level as it is lifted.

BACKGROUND OF THE INVENTION

Traditionally, door lifting devices are designed to lift doors for positioning and installation. Most devices include a balance beam with two sides. One side is a holding base for lifting the door, and the other side is foot plate for a user to step down upon. However, those devices cannot be adjusted to different lifting heights, and are not strong enough to hold the weight of many doors.

The object of the present invention is to provide a door lifting device which is durable enough for the user to lift even a heavy door for installation simply by stepping down on the foot plate and maneuver the door as needed for installation.

More specifically, the object of the present invention is to provide means for adjusting the door lifting device to a specific height such that the door will be lifted to that desired height for door installation given the significant differences in threshold heights.

SUMMARY OF THE INVENTION

In accordance with the objectives of the invention, the embodiments of the present invention relate to a door lifting device. The door lifting device comprises a base plate, a fulcrum extending perpendicularly from the base plate, and a balance beam having a first end and a second end and pivotally connected to the fulcrum. The balance beam includes a foot peddle attached to the first end of the balance beam, and a door carriage is pivotally connected to the second end of the balance beam. The balance beam can be removably secured to the fulcrum at selected heights relative to the base plate. The balance beam can, based on the selected height, pivot from a first position to a second position such that the door carriage can be adjusted from a first height to a second height. During such an operation, the door is kept in an upright orientation because of the pivotal connection of the door carriage to the balance beam. In one embodiment of the present invention, the base plate has a rotating mechanism connecting the base plate and the fulcrum such that the fulcrum is capable of freely rotating on the base plate. In one embodiment, the door lifting device further includes a support arm to secure the door carriage to the fulcrum in order to stabilize the orientation of the door carriage during operation.

In one embodiment of the present invention, the door lifting device further comprises a pivoting mechanism. The pivoting mechanism is capable of adjusting heights of the door carriage relative to the surface. The pivoting mechanism further comprises at least one affixing pin, at least a first pin aperture on the balance beam, and at least second pin aperture on the fulcrum. The balance beam and the fulcrum are connected by inserting the affixing pin through the first and second apertures of the balance beam and fulcrum. The affixing pin serves as a pivot point for the balance beam such that the balance beam is pivotally connected on the fulcrum.

In a preferred embodiment, when the selected height of the balance beam relative to the base is increased, the pivot point is increased relative to the base plate. When the pivot point is shifted away from the door carriage to the second position from the first position on the balance beam, the height of the door carriage relative to the surface is adjusted from the first height to the second height.

In a preferred embodiment of the present invention, the door carriage has a "L" shape including a vertical plate and a horizontal plate. The vertical plate is capable of remaining vertical relative to the base plate throughout movement from the first height to the second height.

In one embodiment of the door lifting device, there is provided a door lifting method. The present invention connects the balance beam with the base plate through the fulcrum. The selected height of the balance beam can be adjusted relative to the base plate. The user further adjusts the pivot point of the balance beam horizontally on the fulcrum to ensure the door carriage can be adjusted to the desired height for the door installation. The door is placed on the door carriage. When the user presses down on the foot plate to lift the door carriage, the door is lifted to the desired height for the door installation.

Two door lifting devices can be coupled together through a connecting bar as shown in FIG. 1 to lift particularly heavy doors and/or to lift particularly wide doors.

These and other objects, advantages, and features of the invention will be more fully understood and appreciated by reference to the detailed description of the current embodiments and the drawings.

DETAILED DESCRIPTION OF EMBODIMENTS

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and to fully convey the scope of the invention to those skilled in the art.

Figure 1:
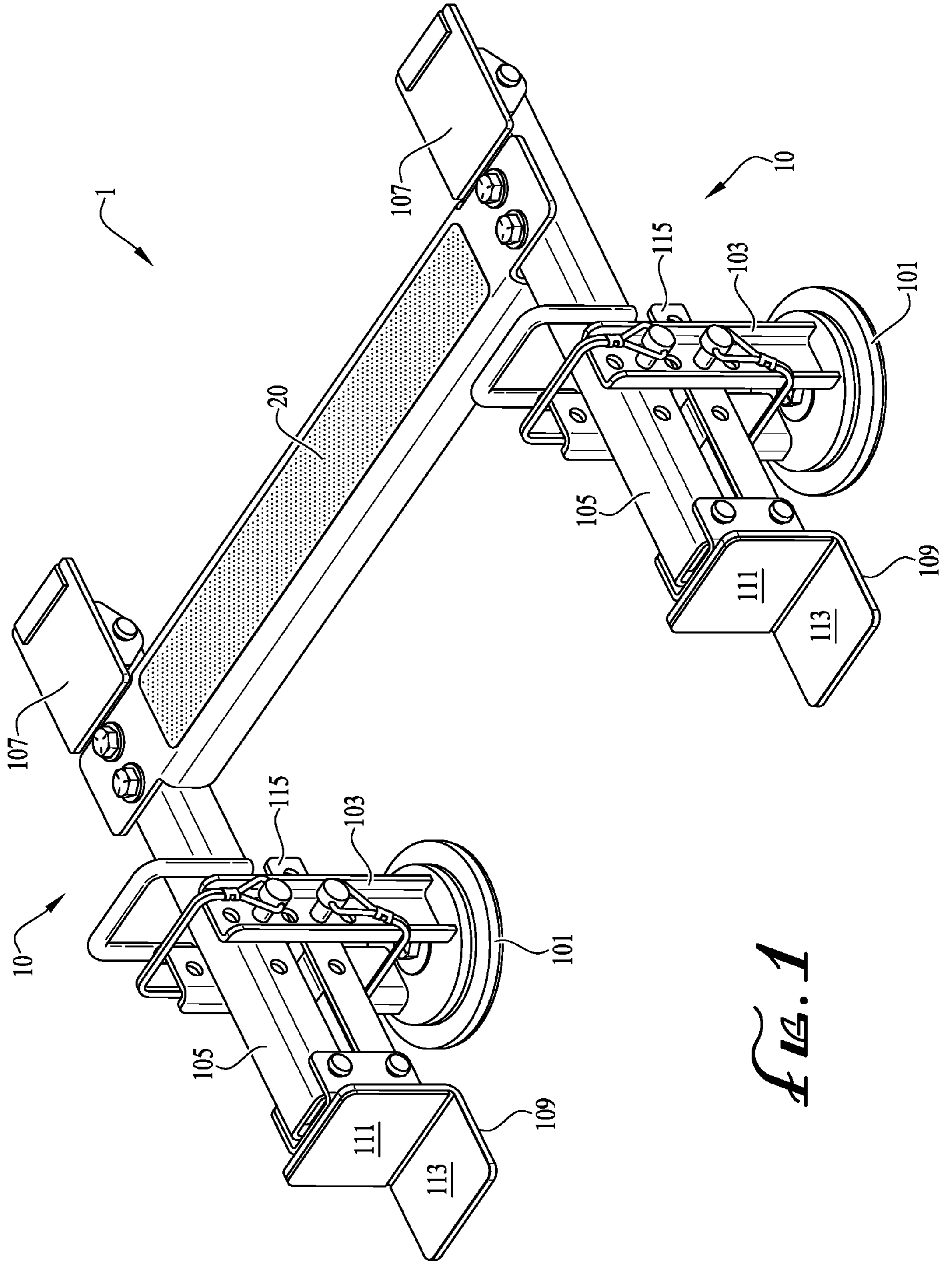
FIG. 1 illustrates a front prospective view of an embodiment of the invention having a pair of connected door lifting devices.

As shown in FIG. 1, a door lifting device 10 according to an embodiment of the invention is comprised of a base plate 101, a fulcrum 103, and a balance beam 105. In one embodiment, the fulcrum 103 is connected to the base plate 101, and extends perpendicularly from the base plate 101. For greater stability, the fulcrum 103 can comprise a pair of parallel fulcrums 103 extended perpendicularly from the base plate 101 wherein the balance beam 105 passes between the pair of fulcrums 103 and is pivotally secured to each of the fulcrums 103. The base plate 101 may further have a rubber lining or other material with a high coefficient of friction so that the base plate 101 does not slide when placed on a surface. A foot plate 107 is connected to a first end of the balance beam 105 and a door carriage 109 is attached to a second end of the balance beam 105. When the door carriage 109 is placed beneath the bottom of a door and a user's foot step down upon the foot plate 107, the door carriage 109 rises thereby lifting the door to a desired height. In a preferred embedment, the door carriage 109 has a "L" shape, having a vertical plate 111 and a horizontal plate 113. In another embodiment, the door lifting device 10 comprises a pair of the door lifting devices 1 operatively coupled together by a connecting bar 20 for the user to easily lift the door to the desired height by stepping down upon the connecting bar 20.

Figure 2:
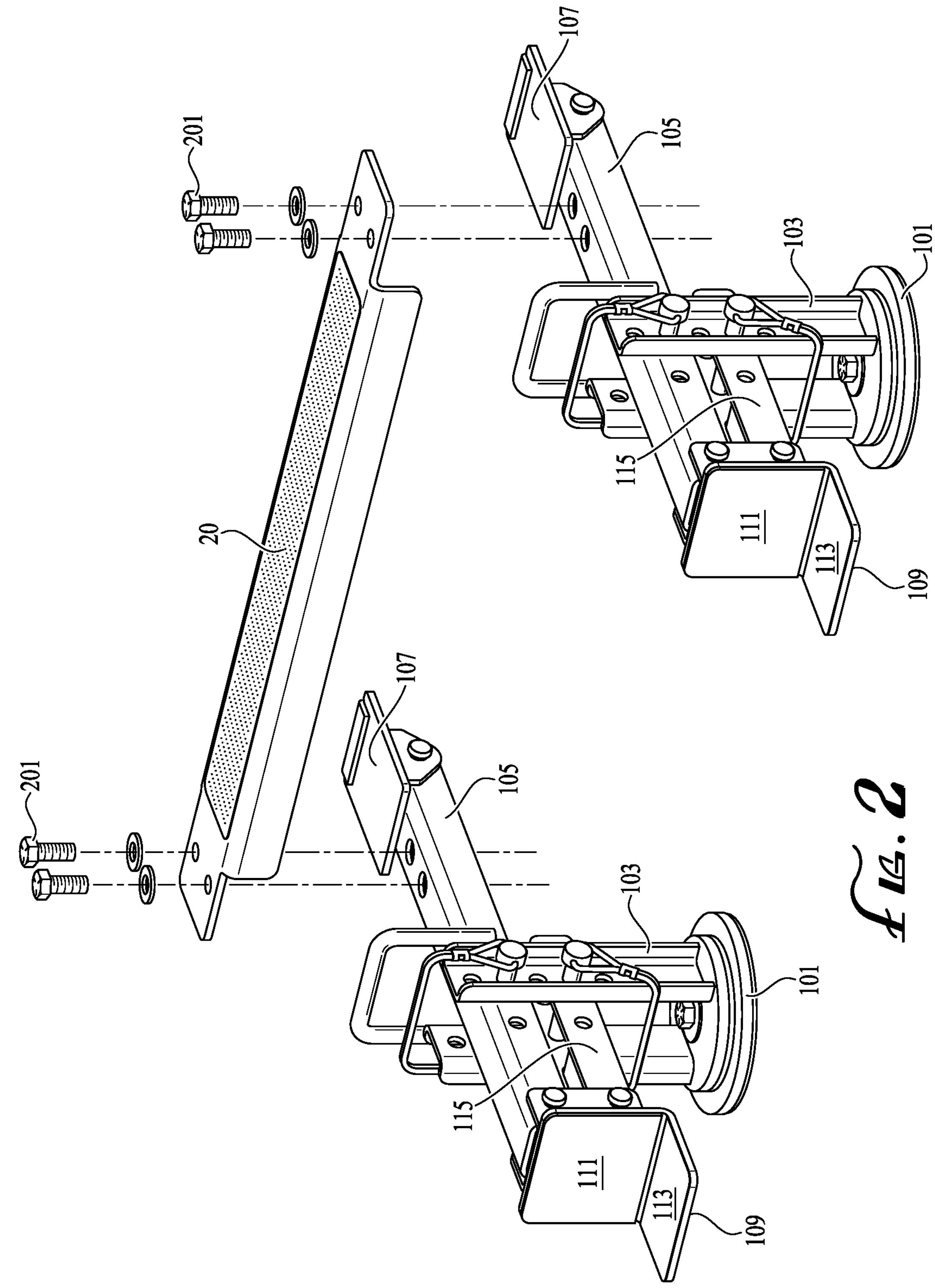
FIG. 2 illustrates a front prospective view of an embodiment of the invention, having the connecting bar for the connection of the pair of doors lifting device.

As further shown in FIG. 2, in a preferred embodiment, the present invention comprises a pair of door lifting devices 1 coupled together by the connecting bar 20. FIG. 2 shows that the connecting bar 20 is fixed on the balance beam 105 using fasteners 201. The fasteners 201 can be screws, bolts or rods, to secure the connecting bar 20 with the pair of the door lifting devices 1. In this way, when the user pushes down on the connecting bar 20, both door carriages 109 rise simultaneously to the same height.

Figure 3:
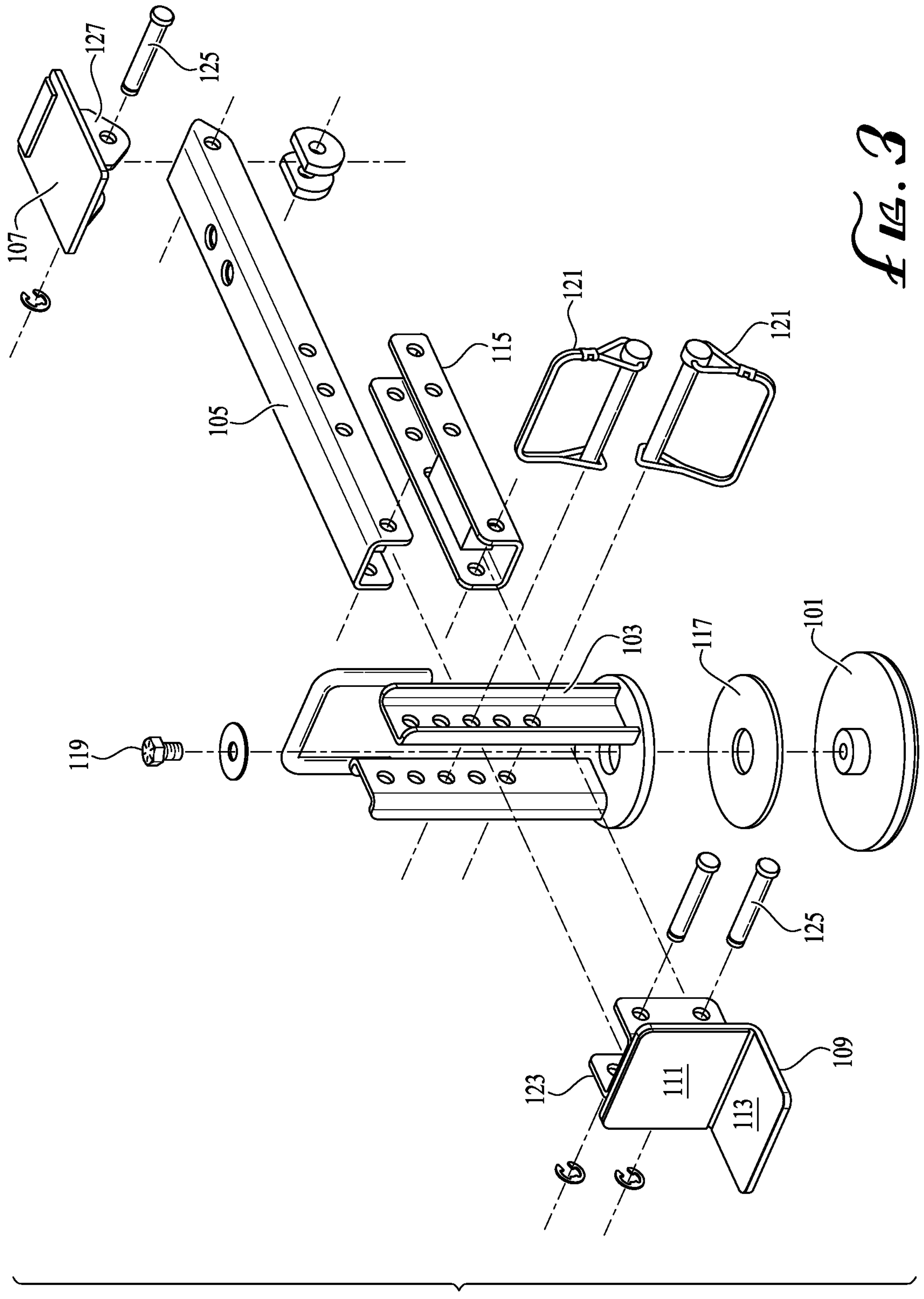
FIG. 3 illustrates an exploded front perspective view of an embodiment of the invention.
Figure 4:
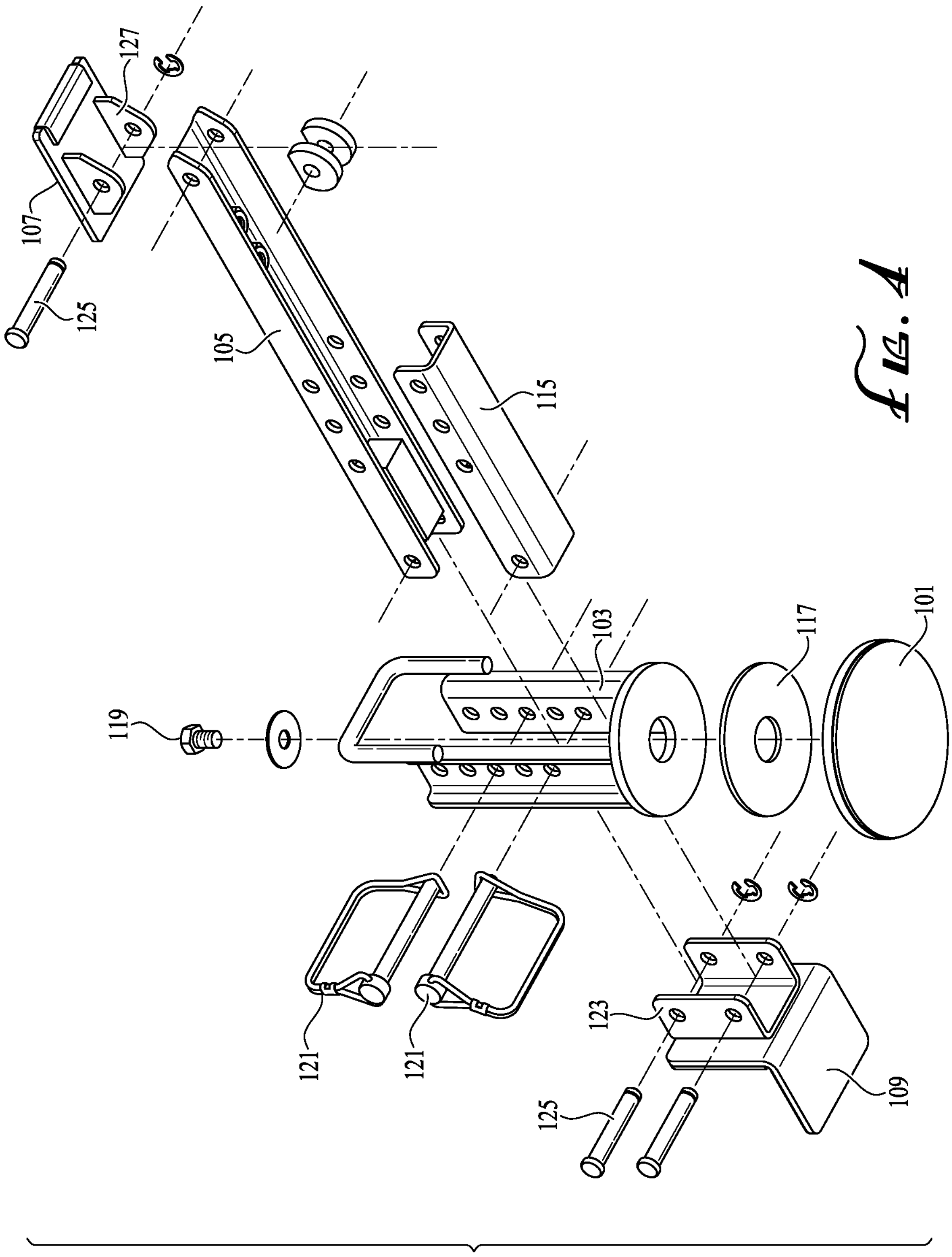
FIG. 4 illustrates an exploded bottom front perspective view of an embodiment of the invention.

Referring now to FIG. 3 and FIG. 4, the foot plate 107 is secured with a first hinge 127 through a hinge fastener 125 at the first end of the balance beam 105. The door carriage 109 is connected to a second hinge 123, and the second hinge 123 is attached to the second end of the balance beam 105 through the hinge fastener 125 so that the horizontal plate 113 of the door carriage 109 can remain parallel to the surface of the base plate 101.

Figure 6:
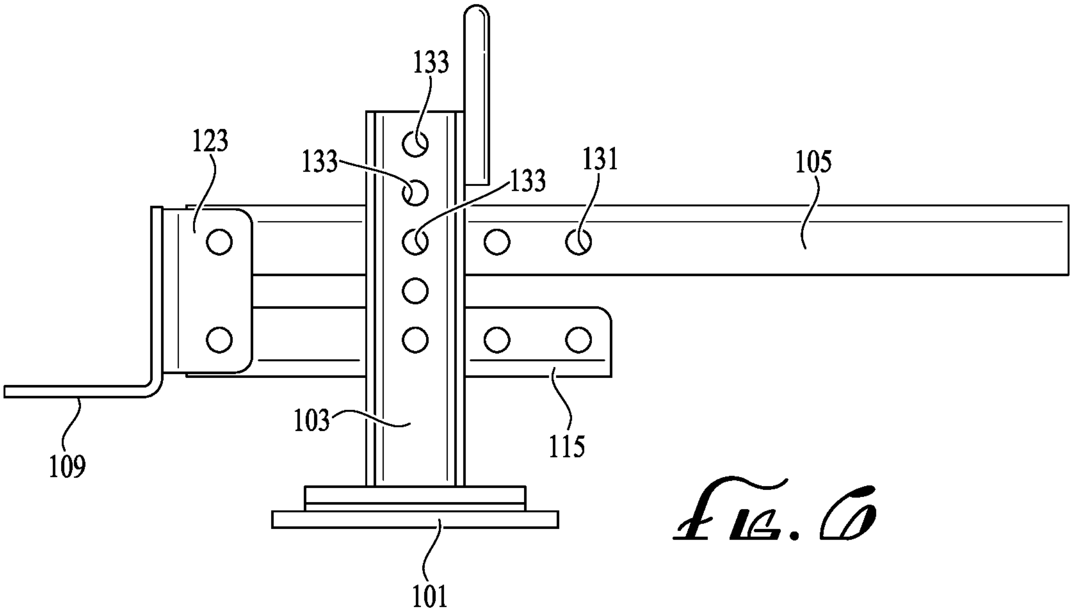
FIG. 6 illustrates a side view of an embodiment of the invention.

In another embodiment, the base plate 101 further has a rotating mechanism 117, allowing the fulcrum 103 to freely rotate. The rotating mechanism 117 may include a caster or ball bearings. The fulcrum 103 is connected to the base plate 101 through the caster or ball bearings by a head screw 119 so that the balance beam 105 connected to the fulcrum 103 can be rotated to a selected orientation for lifting a door. In a preferred embodiment, the fulcrum 103 includes a series of fulcrum pin apertures 133, as shown in FIG. 6, which permit the fulcrum 103 to be removably secured to the balance beam 105 using an affixing pin 121. In one embodiment, the series of the fulcrum pin apertures 133 are spaced at regular intervals and can run along the entire length of the fulcrum 103 such that the height of the balance beam 105 relative to the base plate 101 can be increased or decreased as desired.

Figure 5:
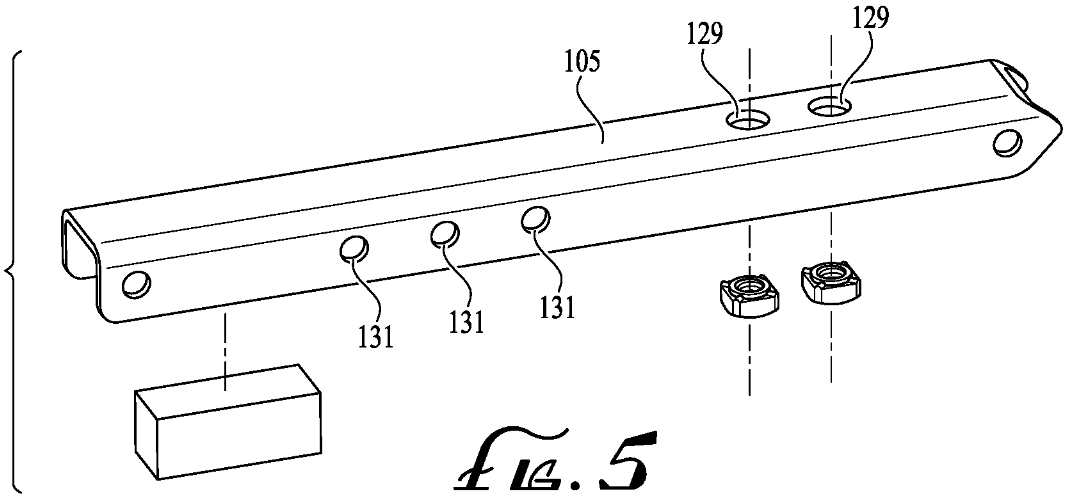
FIG. 5 illustrates an exploded front perspective view of an embodiment of the balance beam of the invention.
Figure 7:
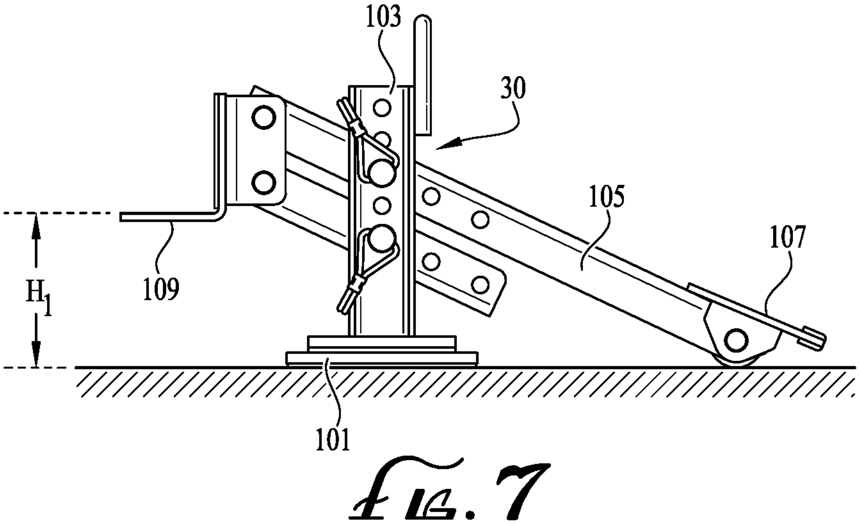
FIG. 7 illustrates a side view of an embodiment of the invention, having the door carriage in the first height relative to the surface.

Referring now to FIG. 3, FIG. 4, FIG. 5 and FIG. 6, the door lifting device 10 comprises a pivoting mechanism 30 having an affixing pin 121, a series of balance beam pin apertures 131, and a series of fulcrum apertures 133. The pivoting mechanism 30, as shown in FIG. 7, is for the user to adjust the door carriage 109 to the desired height. As shown in FIG. 3 and FIG. 5, the affixing pin 121 is affixed with the balance beam 105 and the fulcrum 103 by inserting the affixing pin 121 through one of the balance beam pin apertures 131 and through the fulcrum pin apertures 133. The series of the balance beam pin apertures 131 are spaced at regular intervals on the balance beam 105, as shown in FIG. 5. FIG. 6 shows the attachment of the fulcrum 103 and the balance beam 105 through the pin apertures of the fulcrum and the balance beam 133, 131, respectively. The user can select a specific fulcrum pin aperture 133 to determine the selected height of the balance beam 105 relative to the base plate 101. The affixing pin 121 can also be inserted through different balance beam pin apertures 131 so that the balance beam 105 can be shifted horizontally.

In a preferred embodiment of FIG. 6, the door lifting device 1 includes a support arm 115 to connect the fulcrum 103 with the second hinge 123 of the door carriage 109. The second hinge 123 is attached to the support arm 115 through the hinge fastener 125 on one end of the support arm 115, and the other end of the support arm 115 is coupled to the fulcrum 103 by the affixing pin 121 inserted through one of the fulcrum pin apertures 103, as shown in FIG. 6.

Figure 8:
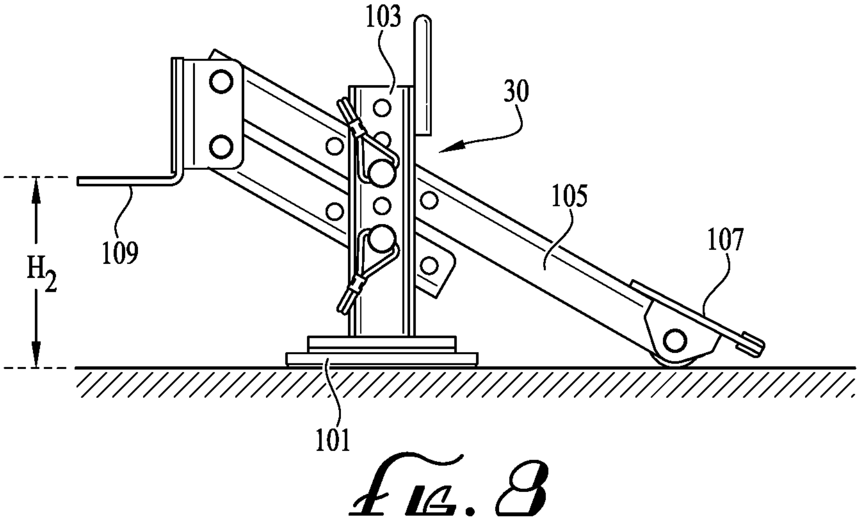
FIG. 8 illustrates a side view of an embodiment of the invention, having the door carriage in the second height relative to the surface
Figure 9:
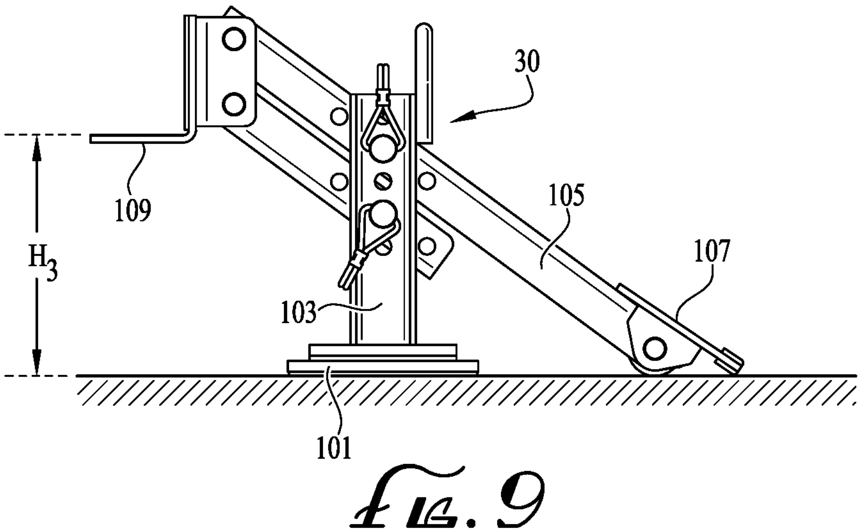
FIG. 9 illustrates a side view of an embodiment of the invention.
Figure 10:
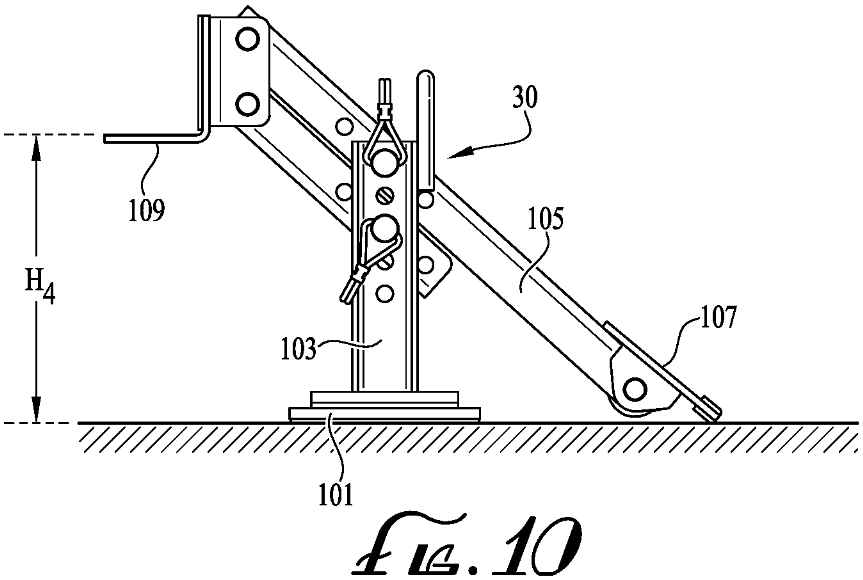
FIG. 10 illustrates a side view of an embodiment of the invention with the pivot point adjusted from FIG. 9.

Referring now to FIG. 7, FIG. 8, FIG. 9 and FIG. 10, the heights of the door carriage 109 relative to the surface can be changed by the pivoting mechanism 30. The user can determine the desired height of the door carriage 109 relative to the needs for a particular door installation. In one embodiment, the desired height of the door carriage 109 relative to the surface can be adjusted by shifting the pivot point vertically or horizontally. The pivot point can be shifted vertically to the selected height of the balance beam 105 relative to the base plate 101, such that the height of the door carriage 109 relative to the surface will be changed. As shown in FIG. 9 and FIG. 10, when the pivot point is increased relative to the base plate 101 by moving up the balance beam 105 to a farther distance from the base plate 101, from FIG. 9 to FIG. 10, the height of the door carriage 109 is changed from $H_3$, as shown in FIGS. 9, to $H_4$, as shown in FIG. 10.

In another embodiment, referring now to FIG. 7 and FIG. 8, the height of the door carriage 109 relative to the surface can also be changed by shifting the balance beam 105 horizontally such that the pivot point will be adjusted closer or farther from the door carriage 109. For example, when the pivot point of the pivoting mechanism 30 is shifted toward a second position, as shown in FIG. 8, from a first position, as shown from FIG. 7, the height of the door carriage 109 relative to the surface is lifted to a second height, $H_2$, from a first height, $H_1$. The door carriage 109 can be adjusted to different heights relative to the base plate 101, depending upon the numbers of the balance beam pin apertures 131, and the numbers of the fulcrum pin apertures 133.

Figure 11:
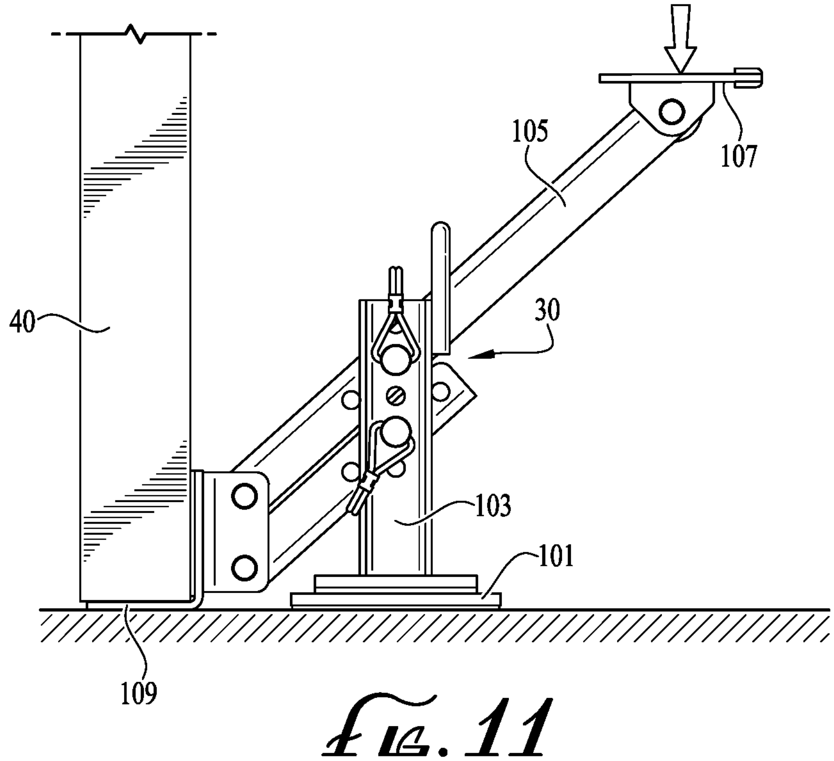
FIG. 11 illustrates a side view of an embodiment, having the door carriage placed under the bottom of the door.
Figure 12:
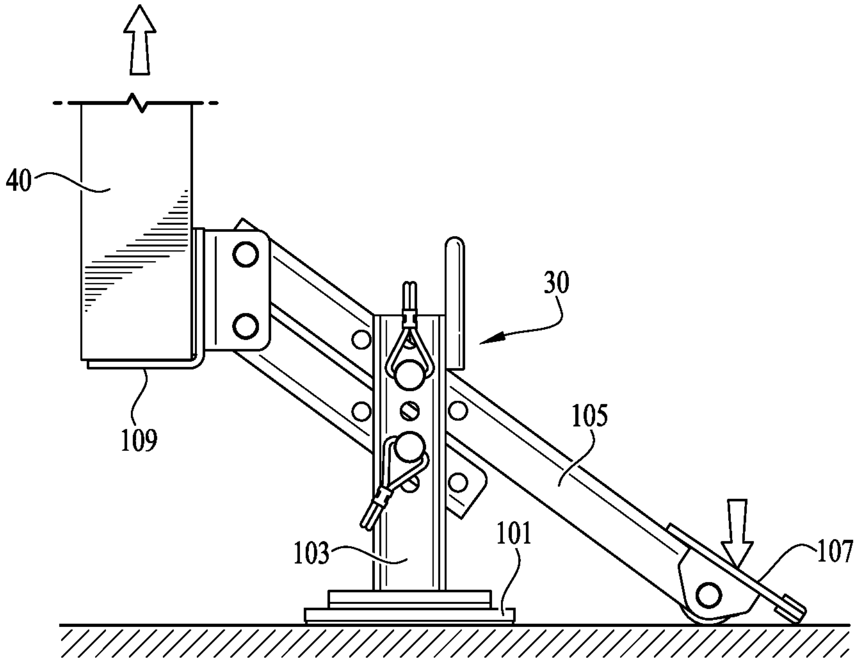
FIG. 12 illustrates a side view of an embodiment, having the door lifted by the door carriage.

FIG. 11 and FIG. 12 show the door installation by the door lifting device 10. In one embodiment, as shown in FIG. 11, the door carriage 109 is placed beneath the bottom of the door 40 before the door 40 is lifted to the desired height relative to the surface. The user will adjust the pivoting mechanism 30, as shown in FIG. 7, such that the door carriage 109 can reach the desired height relative to the threshold for door installation. As shown in FIG. 12, the door carriage 109 is lifted when the user's foot step down upon the foot plate 107 by applying the lifting force on the first end of the balance beam 105.

While illustrative embodiments of the invention have been described in detail above, it is to be understood that the appended claims are intended to be construed to include variations of the present invention.

What is claimed is:

1. A door lifting device comprising:

a base plate;

a fulcrum extending perpendicularly from said base plate;

a balance beam having a first end and a second end, said balance beam is pivotally connected to said fulcrum via a pivot point;

a foot plate, said foot plate attached to said first end of said balance beam;

a door carriage capable of lifting a door, said door carriage attached to said second end of said balance beam;

a pivoting mechanism capable of adjusting a height of said door carriage;

said pivoting mechanism having at least one affixing pin, a plurality of balance beam pin apertures, and a plurality of fulcrum pin apertures;

said at least one affixing pin capable of passing through any one of said plurality of balance beam pin apertures while also passing through any one of said plurality of fulcrum pin apertures to simultaneously adjust said balance beam both vertically and horizontally relative to said base plate, wherein said affixing pin serves as said pivot point for said balance beam;

whereby said balance beam can be pivoted from a first height to a second height, thereby lifting a door resting in said door carriage.

2. The door lifting device of claim 1, further comprising a support arm, said support arm further securing said door carriage to said fulcrum.

3. The door lifting device of claim 1, wherein when said pivot point is increased relative to said base plate, a height of said balance beam relative to said base plate is increased.

4. The door lifting device of claim 1, wherein said door carriage further comprising a "L" shape, said "L" shape having a vertical plate and a horizontal plate, said horizontal plate is configured to remain parallel to said ground.

5. The door lifting device of claim 1, wherein said base plate further comprising:

a rotating mechanism, connecting said base plate and said fulcrum;

wherein said fulcrum is capable of freely rotating on said base plate.

6. An apparatus comprising:

a pair of door lifting devices, said pair of door lifting device coupled together by a connecting bar;

each of said pair of door lifting devices comprising:

a base plate;

a fulcrum extending perpendicularly from said base plate;

a rotating mechanism, connecting said base plate and said fulcrum, such that said fulcrum is capable of freely rotating on said base plate;

a balance beam having a first end and a second end, said balance beam is pivotally connected on said fulcrum via a pivot point;

a foot plate, said foot plate attached to said first end of said balance beam;

a door carriage capable of lifting a door, said door carriage attached to said second end of said balance beam;

a pivoting mechanism capable of adjusting a height of said door carriage;

said pivoting mechanism having at least one affixing pin, a plurality of balance beam pin apertures, and a plurality of fulcrum pin apertures;

said at least one affixing pin capable of passing through any one of said plurality of balance beam pin apertures while also passing through any one of said plurality of fulcrum pin apertures to simultaneously adjust said balance beam both vertically and horizontally relative to said base plate, wherein said affixing pin serves as said pivot point for said balance beam;

whereby said balance beam can be pivoted from a first height to a second height, thereby lifting a door resting in said door carriage.

7. The apparatus of claim 6, wherein each of said pair of door lifting devices further comprising a support arm, said support arm further securing said door carriage to said fulcrum.

8. The apparatus of claim 6, wherein said pair of door lifting devices are moved simultaneously.

9. A door lifting device comprising:

a base plate;

a fulcrum extending perpendicularly from said base plate;

a balance beam having a first end and a second end, said balance beam is pivotally connected to said fulcrum via a pivot point;

a foot plate, said foot plate attached to said first end of said balance beam;

a door carriage capable of lifting a door, said door carriage attached to said second end of said balance beam;

a pivoting mechanism capable of adjusting a height of said door carriage;

said pivoting mechanism having at least one affixing pin, a plurality of balance beam pin apertures, and a plurality of fulcrum pin apertures;

said at least one affixing pin capable of passing through any one of said plurality of balance beam pin apertures while also passing through any one of said plurality of fulcrum pin apertures to simultaneously adjust said balance beam both vertically and horizontally relative to said base plate, wherein said affixing pin serves as said pivot point for said balance beam;

whereby said balance beam can be pivoted from a first height to a second height, thereby lifting a door resting in said door carriage.

10. The door lifting device of claim 9, further comprising:

a connecting bar, a second door lifting device having a second balance beam;

said connecting bar coupling said balance beam to said second balance beam, thereby providing simultaneous movement for said door lifting device and said second door lifting device.

11. The door lifting device of claim 9, further comprising a rotating mechanism connected between said base plate and said fulcrum, whereby said balance beam can be rotated relative to said base plate.

* * * * *